United States Patent Office 3,808,320
Patented Apr. 30, 1974

---

3,808,320
METHOD FOR REPROCESSING RADIOACTIVE MATERIALS
Günter Kaiser, Erich Merz, and Hans-Jürgen Riedel, Julich, Germany, assignors to Kernforschungsanlage Julich Gesellschaft mit beschrankter Haftung, Julich, Germany
Filed May 26, 1970, Ser. No. 40,695
Claims priority, application Germany, May 27, 1969, P 19 26 827.0
Int. Cl. C22b 61/04
U.S. Cl. 423—4                5 Claims

ABSTRACT OF THE DISCLOSURE

A process for recovering uranium, thorium and like materials from fission products of nuclear fuels and breeder elements, wherein the mixture of uranium, thorium, protactinium and fission products is introduced preferably as oxides or mixed oxides, into a fused inorganic pyrosulfate melt and dissolved therein. The pyrosulfate melt is dissolved in water and treated to precipitate thorium as the sulfato-thorate whereupon the liquid phase is treated by tributylphosphate extraction to recover the uranium. Prior to precipitating this sulfatothorate, the aqueous solution is passed through an absorption column to recover protactinium.

(1) FIELD OF THE INVENTION

Figure 1:
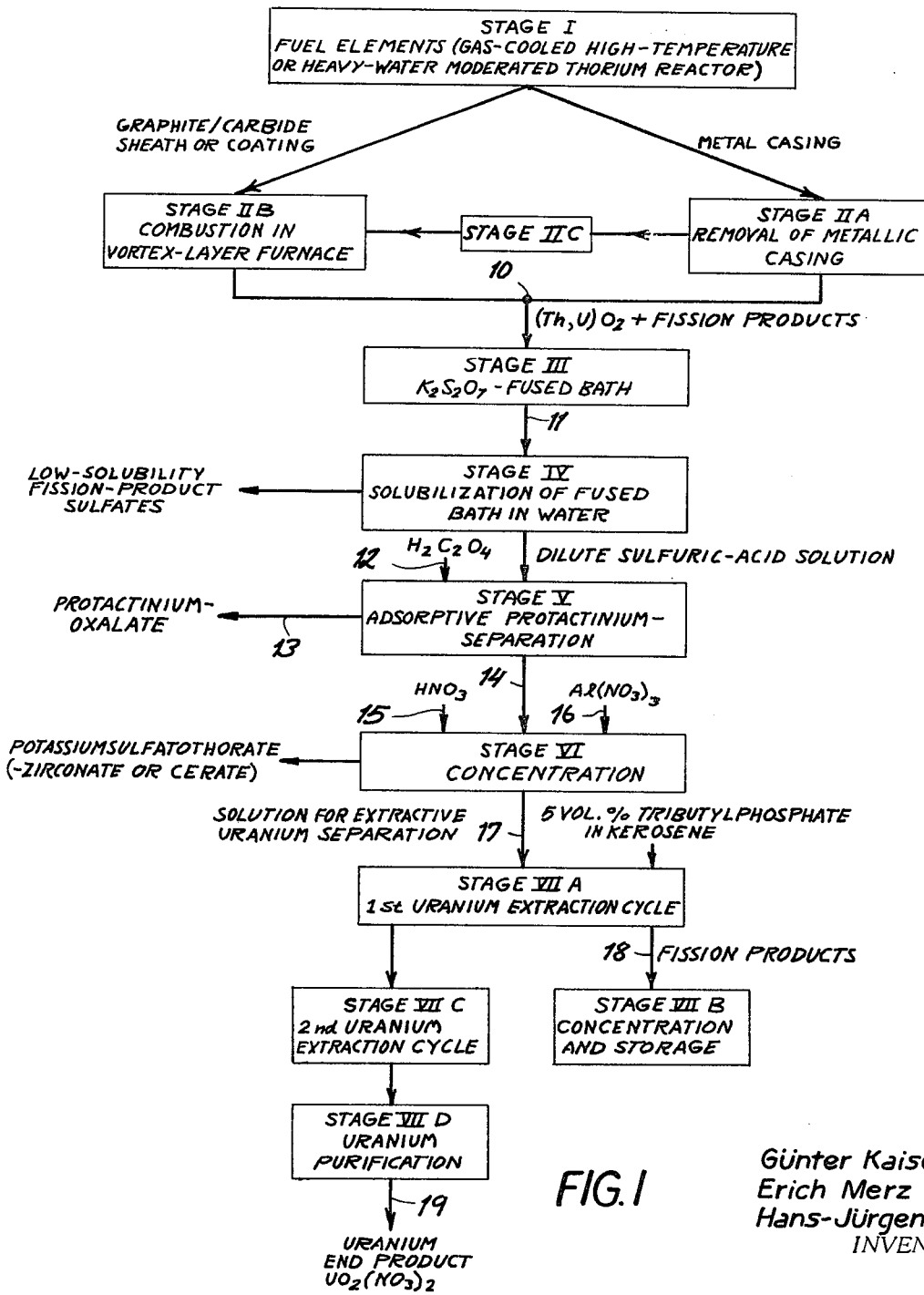

The present invention relates to a method of reprocessing radioactive materials and, more particularly, to a system for the recovery of valuable components from fuel and breeder elements of a nuclear reactor, the substances consisting primarily of uranium and thorium compounds.

(2) BACKGROUND OF THE INVENTION

It is a common practice, both in breeding and nonbreeding reactor operations, to process substances withdrawn form the nuclear-reactor core to recover valuable constituents of such products. For example, depleted nuclear-fuel elements may be reprocessed to recover uranium and thorium compounds which may be used in the formation of new fuel elements, whereas breeder elements of a breeding-type reactor can be reprocessed to recover components which may be recycled to the reactor or components which have been transformed into nculear-reactor fuels. Such "reprocessing," also referred to as fuel recycling, may include numerous steps, depending upon the character of the fuel and breeder elements which must be processed. A preliminary stage invariably is the freeing of the radioactive substance, e.g. uranium or thorium, from the balance of the fuel or breeder element. Following this initial phase of the treatment, it has been the practice heretofore to convert the desired substances (uranium and thorium) into a mixture of oxides or into a uranium-thorium mixed oxide, if the uranium and thorium are not obtained in this form from the preceding stage.

The transformation of uranium and thorium compounds into the oxides or a mixed oxide will, of course, depend upon the compound or compounds in which the uranium and thorium are found following the first phase of the process. When uranium and/or thorium are available as the carbides, the transformation to the oxide state includes combustion in which the carbon is evolved as a carbon oxide and the metals (thorium and uranium) are likewise obtained as the oxides. In a further stage, the oxide mixture or mixed oxides are dissolved in concentrated nitric acid which may contain fluoride ions, the latter apparently serving as catalysts to promote the solubilization of the uranium or thorium oxide mixture and mixed oxides. The use of the fluoride-ion catalyst to promote solubilization is especially important when the material to be solubilized is a highly sintered uranium-thorium mixed oxide, the latter having been found to be soluble in nitric acid only with considerable difficulty. It is not uncommon for the solubilization of such substances to take 12 hours or more.

When fuel elements or breeder elements having a high thorium-uranium proportion are to be processed, there is also the danger that extraction will give rise to two organic phases. The disadvantage of this is that a cleancut separation of the two phases is not possible so that considerable uranium losses are encountered and must be taken into consideration. In these processes, thorium, uranium, their fission products and generally also protactinium are present in solution as nitrates and it has been proposed to remove the uranium or uranium and thorium by extraction with a solution of tributylphosphate in a hydrocarbon. Typical continuation of this process has led to the recovery of a pure uranyl nitrate solution and an impure solution containing thorium nitrate, fission products and protactinium, pure uranyl nitrate solution and pure thorium nitrate solution together with a further solution containing protactinium and fission products, etc. In all of these cases the protactinium-containing solution is contaminated with impurities such as the fission products mentioned earlier.

Protactinium is, of course, a precursor of uranium-233 which is a desirable product of the uranium recovery operation and hence it is desirable to obtain protactinium in a relatively pure state or in a state in which it can be effectively used. It is, of course, possible to permit decay of protactinium to uranium-233 and then recover this substance by the technique enumerated earlier. This has the disadvantage that periods of up to a year are required for the decay of protactinium to uranium. At this point, a further extraction must be carried out with tributyl phosphate and the cost of storage, subsequent extraction, etc. renders this proposal uneconomical. It is conceivable also to store the fuel or breeder material without extraction until the protactinium decays sufficiently; this has the advantage over the process discussed immediately above that additional extractions are not required, but also is characterized by the disadvantage of requiring prolonged storage times for larger amounts of material.

Efforts have been made to reprocess irradiated thorium-containing fuel and breeder materials by chlorination, these processes having the advantage over extraction processes that the recovery and treatments can be carried out in concentrated form and, therefore, in compact apparatus. It has not been successful, however, to provide a similar process for the recovery of uranium from irradiated thorium-containing fuel and breeder materials since the chlorides which are formed preferentially are those of the fission products, e.g. zirconium, molybdenum, niobium and technetium. The boiling points of these compounds are close and approximate that of the uranium chloride so that they condense together with the latter. For this reason, it has not been possible heretofore to obtain pure uranium compounds free from contamination by fission products. Another process which may be mentioned is that of treating irradiated thorium and uranium-containing fuel or breeder materials with fluorides in such manner as to volatilize the uranium contained within the thorium matrix as a result of irradiation. The recovery of uranium is, however, not quantitative and it is not possible to recover protactinium from the fission products.

(3) OBJECTS OF THE INVENTION

It is, therefore, the principal object of the present invention to provide an improved process for reprocessing fuel and fissionable materials, as obtained from nuclear reactor cores in which uranium can be obtained in a highly pure state and in an economical manner.

It is another object of the invention to provide a process for recovering protactinium in a useful form, free from contamination by fission products, and in a technologically economical manner.

(4) SUMMARY OF THE INVENTION

These objects and others, which will become apparent hereinafter, are attained by a method for reprocessing nuclear fuel and nuclear breeder elements in which the fuel and the breeder materials are in the form of thorium and uranium compounds and which is applicable to fuel and breeder elements of various forms and constructions and yet economically permits the recovery of uranium and protactinium, the invention being particularly applicable to the fissionable-fuel and breeder elements of gas-cooled high-temperature reactors in which graphite serves as a moderator. The elements, with which the present invention is operable, may be in the form of balls or rods or other in particulate form and it is independent of the manner in which the fuel or breeder substance is incorporated in the fuel or breeder element. The invention is applicable as well to systems in which the fuel and/or breeder elements consist of metal shells or casings of Zircaloy or stainless steel and contain particles of uranium-thorium mixed oxides without coatings.

According to the principles of the present invention, the pyrosulfate melt, containing thorium, uranium sulfates of fission products and protactinium, is dissolved in water, whereupon the slightly soluble sulfates of the fission products precipitate and a solution is decanted which contains the essential compounds to which recovery is directed, namely, thorium, uranium and protactinium.

In the next step, according to the invention, the protactinium-containing solution is subjected to adsorption treatment in an adsorption column and contacted with adsorptive agents capable of preferentially taking up protactinium, the protactinium being eluted preferably as the oxalate, from the adsorbent which may be silica gel, Vycor glass or another adsorbent. The resulting solution, containing now thorium and uranium, is treated to precipitate the thorium as a low-solubility sulfato-thorate, e.g. the potassium sulphato-thorate, to produce a solution containing uranium and substantially free from thorium, the fission product normally present in nuclear fuel elements and in breeder elements, and protactinium. This uranium-containing solution may be treated with tributylphosphate extracting solutions in accordance with the principles set forth, for example in Laboratory Development of the Thorex Process, Oak Ridge National Laboratory, 1952, (p. 1387 ff.).

The method of the present invention has the important advantage that solubilization of the thorium-uranium mixed oxides in the fused pyrosulfate bath is substantially complete within a relatively short time and the subsequent steps allow a quantitative removal of the fission-product contaminants generally zirconium, molybdenum, niobium and technetium, as well as a quantitative and selective recovery of protactinium. Further, the adsorption process may be carried out continuously with the column packing being reusable in a highly economical manner.

Moreover, the thorium separation subsequent to recovery of protactinium and prior to extraction of the uranium-containing solution with tributyl phosphate, provides a significant saving in these later steps as well. Generally, the elements removed from a nuclear reactor contain thorium and uranium in a weight ratio of 5:1 to 20:1 and, by precipitating the thorium from the solution, we are able to carry out the final extraction upon one-fifth to one-twentieth of the material which otherwise would have to be treated. Also, since the solution which is subject to extraction contains also 100% uranium (in terms of the metals mentioned earlier), the product of the extraction process has a high degree of purity.

According to a more specific feature of this invention, the solution, prior to extraction with tributylphosphate, is supplied with aluminum nitrate and nitric acid to a composition of substantially 20 g./liter uranium, 1 mole/liter aluminium nitrate and 2.5 moles/liter of free acid, the total sulfate being adjusted to ≤0.5 mole/liter; the sulfate content of course depends upon the thorium/uranium ratio in the thorium-uranium mixed oxide. Using a solution of the aforedescribed composition, extraction is carried out with a solution of 5% by volume of tri-n-butylphosphate (TBP) in kerosene in an extraction apparatus having a conventional extraction portion and scrubbing portion. The extraction device may be a mixer-settler or a pulsed column and the scrubbing of the extracted product is carried out with an aqueous solution containing 5 moles/liter of nitric acid. Best results are obtained when a plurality of extraction cycles are provided in succession.

(5) DESCRIPTION OF THE DRAWING

Figure 2:
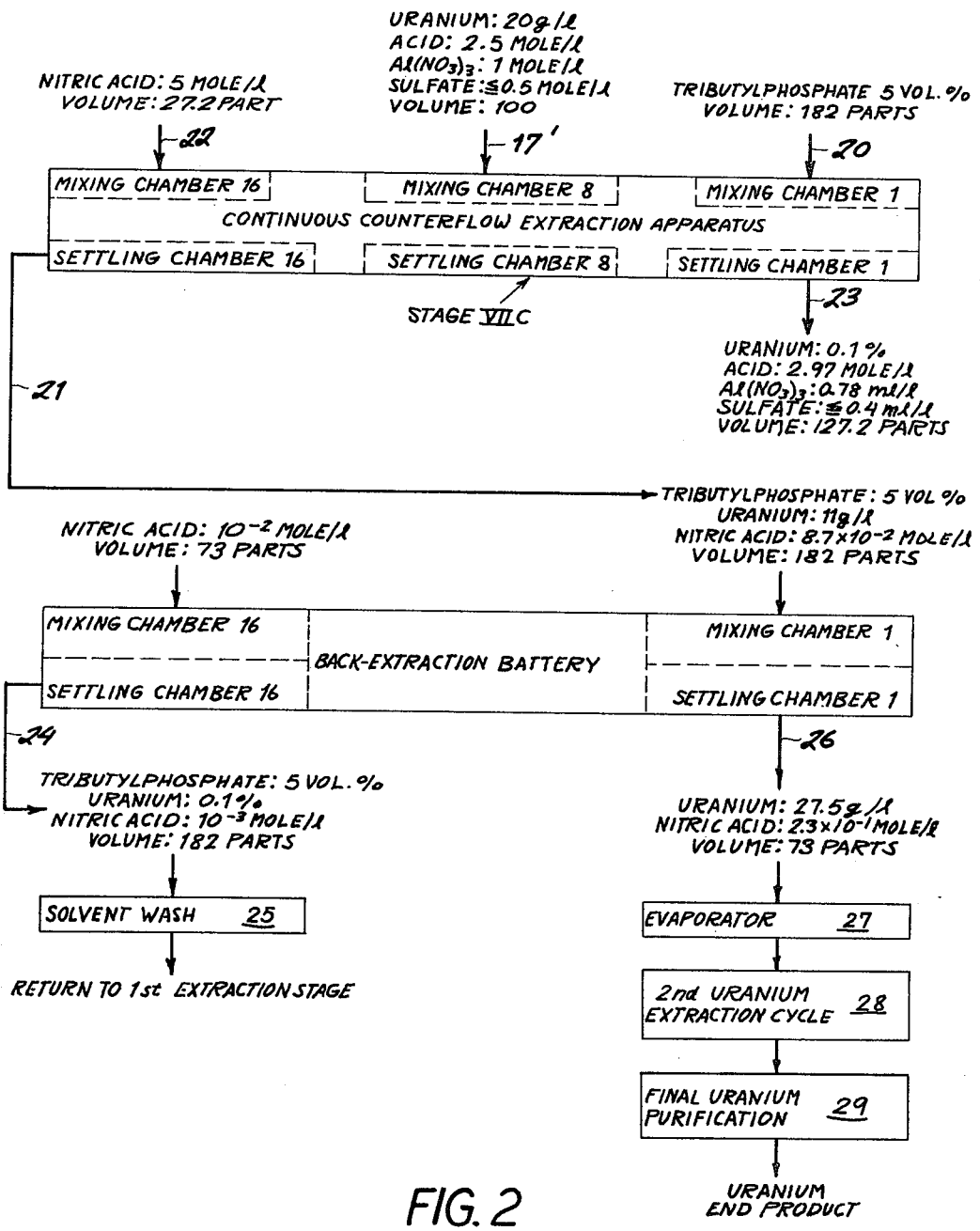

The invention is described below in greater detail in terms of specific examples, reference being made to the accompanying drawing in which FIGS. 1 and 2 are flow diagrams illustrating the invention.

(6) SPECIFIC DESCRIPTION

As seen in FIG. 1, the process comprises recovery from a nuclear reactor (Stage I) of fuel elements (or breeder elements) e.g. from a gas-cooled high temperature reactor. Such elements are generally contained in a metallic shell or are incorporated in a graphite or carbon body and may include carbon or graphite-coated particles. If a metal casing is present, it may be removed mechanically (Stage IIA), for example, by cutting open the casing. When the thorium and uranium materials are provided with a sheath or coating of graphite or pyrolytic carbon or are enclosed in a graphite or carbon body, the sheath, coating or body is destroyed by combustion (Stage IIB) in a fluidized bed furnace or in a shaft furnace at a temperature between 700° and 850° C.

In certain cases, e.g. when the radioactive materials are of the coated-particle type but are reecived in a metal casing, it may be desirable to perform a comminution step (Stage IIC) and thereafter subject the particles to the combustion action in Stage IIB. Consequently, there is recovered at 10 uranium and thorium compounds which have been transformed into uranium and thorium oxides and especially uranium-thorium mixed oxides as well as fission products in a mixture which is introduced at Stage III into a fused bath of an inorganic pyrosulphate maintained at a temperature of 800° C. and preferably consisting of alkali-metal pyrosulphates, especially potassium pyrosulphate ($K_2S_2O_7$). The mixture dissolves substantially completely in the fused pyrosulphate bath. The proportion of potassium pyrosulphate to the fuel or breeder materials which are to be solubilized should be, by weight, about 5:1. While the time required for solubilization of the mixture in the fused pyrosulphate melt is dependent upon the material to be treated and the composition thereof, this solubilization occurs significantly more rapidly than dissolutions provided in the prior art in fuel-recovery systems. The solubilization of the mixture is carried out in a receptacle which is inert to be attacked by the pyrosulphate at the elevated temperature at which it is maintained and preferably is platinum or a platinized metal.

As soon as solubilization has terminated, the liquid melt is forced into a water-filled vessel, preferably under pneumatic pressure, the weight ratio of the melt to the water being substantially 1:40. The resulting dissolution of the melt in the water is substantially instantaneous, in part as a consequence of the fact that blowing the melt into the water assures its fine distribution as the melt contacts the water and permits dissolution to occur over a large surface area. Again, the vessel used for dissolving the melt in water should be corrosion-resistant and is preferably a corrosion-resistant or stainless steel such as that marketed under the trade designation Hastelloy.

The resulting solution, obtained at 11, consists of water (the solvent), hydrolyzed potassium pyrosulphate, slightly soluble sulphates of fission products such a barium sulphate and strontium sulphate and soluble compounds of uranium, thorium, protactinium and fission products. The solution is then filtered and the filtrate, consisting substantially of all the original thorium and uranium, some fission products and protactinium, is supplied to the following stage (Stage IV).

In this stage, the solution is subjected to treatment with an adsorbent selectively and preferentially capable of adsorbing protactinium. We have found that finely divided siilca gel Vycor glass and like materials are capable of adsorbing $Pa^{233}$ substantially completely, i.e. to an amount of at least 96%. The treatment is carried out in a column packed with the adsorbent. Following the passage of the solution 11 through the adsorption column, the protactinium is desorbed or eluted. The elution solution may be any conventional substance known to be capable of desorbing protactinium from a silica gel adsorber and preferably is concentrated sulphuric acid or oxalic acid. When the elution solution contains oxalic acid, represented as introduced at 12, the protactinium is recovered in the form of a protactinium oxalate solution 13. Adsorption is carried out in Stage V as illustrated in FIG. 1. It has been found that the adsorption capacity of silica gel and Vycor glass is approximately 5 mg. protactinium per gram of adsorbent.

According to the invention, two adsorption columns are provided and are functionally interchanged periodically, e.g. when the respective adsorbent is saturated with protactinium so that one column serves to remove protactinium from the solution while the other undergoes elution to strip protactinium from the adsorbent.

Another advantage of the process of this invention is that the adsorbent is reusable for many cycles and thus replacement of the adsorbent is not necessary for prolonged periods.

Following adsorption, the liquid passes at 14 into Stage VI, according to the present invention, and is substantially free from protactinium ($Pa^{233}$), so that it consists essentially only of thorium, uranium and soluble fission products compounds. In Stage VI, the solution is first concentrated, thereby precipitating the thorium as low-solubility potassium sulfato-thorate. Any zirconium or cerium, which may remain, is likewise precipitated in this stage as the potassium sulfato-zirconate or as the potassium-sulfato-cerate. After filtration, the filtrate contains uranium and is substantially free from thorium, protactinium and the above mentioned fission products. Now, nitric ($HNO_3$) is supplied and aluminium nitrate is added (arrow 16). The resulting solution can be subjected to solvent extraction with tributyl phosphate as described below.

We have found that best results are obtained, when prior to the extraction stage (Stage VII), the uranium content of the solution to be subjected to extraction is brought to a level of about 20 g. per liter and, advantageously, the extraction-feed solution contains 20 g. per liter of uranium, 1 mole per liter of aluminum nitrate and 2.5 moles per liter of free acid. The separation of the low-solubility sulfato-thorate in Stage VI may be carried out continuously, e.g. in a cyclone precipitator, a continuous centrifuge. The thorium salt can be processed for reuse in the reactor or can be treated as a radioactive waste and stored in the usual manner.

As shown in FIG. 1, the uranium-containing extraction-feed solution is lead at 17 to the first step of the extraction Stage VII, represented as a uranium extraction cycle Stage VIIA with any fission products and decay products being recovered at 18. These products may be concentrated, processed and stored (Stage VIIB) in any conventional manner. Extraction is carried out with a 5-volume percent solution of tri-n-butyl phosphate (TBP) in kerosene. In the system illustrated in FIG. 1, the first extraction cycle is followed by a second uranium-extraction cycle VIIC, a final purification step (Stage VIID) and by a recovery phase at which the uranium-containing end product is recovered at 19. The final product is, of course, $UO_2(NO_3)_2$.

The uranium extraction cycles each may consist of two multistage mixing and settling systems known in the literature as a mixer-settler, with the extraction plant being so operated that the first device has an extraction portion and a washing portion or zone. The plant is, moreover, provided in the conventional manner with a solvent-washing system and an evaporator in a recycling path. Furthermore, the extraction is carried out in the apparatus in a countercurrent technique whereby the uranium-extraction feed solution is passed countercurrent to the solution of TBP in kerosene.

In place of the mixer-settler, the extraction can be carried out in any extraction apparatus known to the art including pulsed columns, centrifugal extractors or the like. Since these extractors have an efficiency per stage of about 75%, i.e. about 75% of all the extractable material is removed from the extraction-feed solution per stage, it has been found to be advantageous to provide at least eight stages or to recycle the material at least eight times through the extraction stage. The washing and extraction sections should each, therefore, comprise a minimum of eight stages. It has also been observed that the uranium distribution coefficient or partition coefficient is greater when the sulphate concentration is less than 0.5 mole per liter and, in the event of low sulphate concentrations, the number of stages may become correspondingly reduced. In general, the extraction solution should be constituted by 5-volume percent TBP in an aliphatic hydrocarbon having a boiling point between 200 and 245° C. and, to this end, kerosene has been found to be most effective since it consists of a mixture of hydrocarbons of this boiling-point range.

We have also discovered that there exists an optimum volume ratio between the TBP solution serving as the extraction solution, and the extraction-feed solution produced in Stage VI, this optimum ratio being 182:100. To backwash the extracted fission products, we provide a 5-molar solution of nitric acid, the ratio between this solution and the extracting solution being by volume 27.2:100.

The relatively high acid concentration of the backwash or scrub solution has been found to be particularly effective in assuring ruthenium decontamination. Moreover, it reduces the zirconium, niobium and cerium concentrations in the organic phase. In the extraction zone of the extraction apparatus, more than 99.9% of the original uranium content of the solution arising from Stage VI is removed.

The organic phase, recovered from the extraction apparatus at the washing zone, contains about 11 g./liter of uranium and is subjected, in another stage of the extraction process (Stage VII) to a stripping battery in which the organic phase is treated with nitric acid in $10^{-2}$ molar solution to recover the uranium as an aqueous uranylnitrate [$UO_2(NO_3)_2$] solution. It has been found that the flow ratio (volume rate of flow) of the aqueous and organic phases during stripping should be about 0.4 and that four such stripping stages should be used in succession to enable the recovery of more than 99.9% of the uranium from the organic phase. As a result, the aqueous phase leaving the stripping battery may contain about 27.5 g./liter of uranium while the uranium content of the organic phase is less than 0.1%.

In FIG. 2, the nature of the extraction Stage VII is made somewhat clear. In the last of the uranium extraction cycles, Stage VIIC, sixteen mixing chambers and sixteen settling chambers are provided, the general flow through the system being in the direction of the arrow A.

Into the first mixing chamber, tributyl phosphate at 5 volume percent in kerosene (182 parts by volume) is introduced while at the center of the reactor, e.g. in mixing chamber 8, the solution obtained at 17 from Stage VI is introduced. This introduction is represented at 17' while the solvent (organic phase) is introduced at 20. Consequently, the organic phase enriched in uranium is recovered from the settling chamber of the last stage at 21 and contains 5% tributylphosphate in kerosene, 11 g./liter of uranium, and $8.7 \times 10^{-2}$ moles/liter of nitric acid, and consists of about 182 parts by volume. The solution introduced at 17' makes up 100 parts by volume. 27.2 parts of the scrub solution (5 moles per liter of nitric acid) is introduced into the continuous counterflow extraction apparatus at 22, i.e. at the last mixing chamber and at the first settling chamber an aqueous phase is removed at 23 which contains less than 0.1% uranium, about 2.97 moles/liter free acid, 0.78 mole/liter aluminum nitrate at most 0.4 mole/liter sulfate and is present in an amount of 127.2 parts by volume.

The uranium-containing organic phase at 21 is fed to a countercurrent stripping battery, also operating in a continuous manner, at the first mixing chamber. Into the last mixing chamber is introduced the aqueous stripping phase ($10^{-2}$ molar nitric acid in an amount of 73 parts by volume), while the organic phase stripped of uranium is recovered at the last settling chamber as represented at 24 and constitutes the tributyl sulphate solution containing less than 0.1% uranium and about $10^{-3}$ moles/liter nitric acid, and is present in an amount of about 182 parts by volume. The solvent may be distilled and otherwise purified at 25 for return to the first extraction stage (Stage VIIA).

From the first settling chamber, there is recovered at 26, an aqueous phase containing 27.5 g./liter of uranium, $2.3 \times 10^{-1}$ moles/liter of nitric acid and represents about 73 parts by volume. This solution is supplied at 27 to an evaporator and is subjected to a second uranium extraction cycle at 28, and final purification at 29. Extraction cycle 28 and the purification stage 29 may be of the type described in J. T. Long, Engineering for Nuclear Fuel Reprocessing, Gordon and Beach Science Publishers, Inc., New York, 1967.

(7) SPECIFIC EXAMPLE

Five ball-shaped fuel elements irradiated in a gas cooled high-temperature thorium reactor having an outer sheath each of about 200 g. graphite and containing 1.8 g. of $UO_2$ and 10.2 g. of $ThO_2$ in the form of coated particles, the coatings being made up of 4 grams of pyrolytic carbon. The fuel elements are broken up in a hammer mill and are subjected to combustion in a shaft furnace at 800° C. with oxygen. After combustion of the graphite and carbon, thorium-and-uranium-mixed oxide particles (60 grams) were obtained and were gradually dissolved in 270 g. of molten potassium pyrosulphate over a period of four hours and at a temperature of about 800° C. The melt was contained in a platinum crucible.

Following the dissolution of the mixed oxides, the hot melt was pneumatically sprayed into 10 liters of water and a solution formed from which barium and strontium sulphate could be removed by centrifugation, filtration or the like. Since the elements were only lightly subjected to irradiation, there was no need for this separation step. The aqueous solution contained $1.93 \times 10^{-2}$ moles/liter thorium, $0.34 \times 10^{-2}$ moles/liter uranium, $2.12 \times 10^{-1}$ moles/liter potassium, $3.18 \times 10^{-2}$ moles/liter free acid, $1.641 \times 10^{-1}$ moles/liter sulfate and protactinium.

The solution was fed through an absorption column having a diameter of 21 mm., a length of 60 cm. and a packing of 120 g. of Vycor glass with a particle size of 0.15 to 0.2 mm. The flow rate was about 0.15 ml.·cm.$^{-2}$·min.$^{-1}$. The protactinium is adsorbed on the glass beads and is subsequently eluted with 0.5 molar oxalic acid for a total recovery of 98% of the protactinium from the solution traversing the column.

The solution substantially completely freed from protactinium is neutralized with a potassium hydroxide solution and is introduced into an inclined-tube recirculating evaporator with means for continuous removal of solids and thereby brought to 1/40 of its original volume, whereupon potassium sulfato-thorate precipitates. Uranium lost during this stage of the process is insignificant and after washing once with water, the solids recovered at this stage contain less than 0.1% of the total uranium.

The filtrate or decantate contains 0.136 mole/liter of uranyl sulphate, 0.652 mole/liter of potassium sulphate and 0.04 mole/liter of sulphuric acid.

This latter solution is treated with aluminum nitrate and nitric acid to form a solution containing 0.0842 mole/liter of uranylsulphate (corresponding to 20 g./liter of uranium), 0.8 mole/liter of potassium, 2.5 moles/liter of free acid, 1 mole/liter aluminum nitrate and total sulphate of 0.5 mole/liter.

The solution was subjected to an extraction cycle, as illustrated in FIG. 2, consisting of two 16-stage extraction apparatus of the mixer-settler type. The various inputs are illustrated in FIG. 2. The 5-molar nitric acid solution is introduced at 22 with a velocity of 0.75 ml./minute while the TBP solution at 20 is introduced at 5 ml./minute. At least 99.9% of the total uranium is recovered from the starting aqueous solution while the aqueous phase leaving the first settling chamber of the extraction apparatus contains less than 0.1% uranium. The organic phase contains 11 g./liter of uranium and is treated with $10^{-2}$ molar nitric acid in the back-extraction apparatus to recover 99.9% of the uranium from the organic phase. The uranium is then recovered as described in connection with FIG. 2.

We claim:

1. A method of reprocessing fuel elements from a nuclear-reactor core, said elements containing uranium and thorium compounds together with protactinium in a jacket composed of graphite or metal, said method comprising the steps of:
   (a) removing said jacket to expose a radio-active mass by burning said jacket with oxygen when said jacket is graphite or opening said jacket when the same is composed of metal;
   (b) reacting said mass with a potassium pyrosulfate melt;
   (c) dissolving the melt obtained in step (b) in water to form a first aqueous solution;
   (d) passing said first aqueous solution through a protactinium-specific adsorbent selected from the group which consists of silica gel and leached borosilicate glass to remove protactinium and form a second aqueous solution containing thorium and uranium but substantially free from protactinium;
   (e) evaporating said second solution to substantially 1/40 of its original volume to precipitate thorium therefrom quantitatively as sparingly soluble potassium sulfatothorate which forms a third aqueous solution containing uranium and substantially free from thorium upon removal of precipitated potassium sulfatothorate; and
   (f) extracting said third solution with a solution of tri-n-butylphosphate in an inert organic diluent to recover uranium therefrom.

2. The method defined in claim 1 further comprising adding aluminum nitrate and nitric acid to said third solution formed in step (e) to adjust the composition thereof such that said second solution contains substantially 20 g./liter of uranium, 1 mole/liter of aluminum nitrate, 2.5 moles/liter of free acid and total sulfate of not more than 0.5 mole/liter.

3. The method defined in claim 2 wherein said tri-n-butylphosphate is in a solution containing about 5 volume percent thereof in kerosene, the kerosene and the tri-n-butylphosphate forming an organic phase step (f) comprising the substeps of:

(f$_1$) countercurrently extracting the compositionally adjusted third solution with said organic phase in a liquid-liquid extraction system containing a plurality of extraction stages divided into a first end extraction stage wherein said compositionally adjusted third solution is introduced into said system, a plurality of intermediate extraction stages and a second end extraction stage for introduction of said organic phase into said system, and a plurality of scrub stages preceding said first end extraction stage at which the organic phase is scrubbed after extraction of said compositionally adjusted third solution with a 5 molar nitric acid solution;

(f$_2$) countercurrently stripping the organic phase after the scrubbing thereof with said 5 molar nitric acid solution, in a second liquid-liquid extraction system with an aqueous solution of about $10^{-2}$ molar nitric acid to form a uranium-containing aqueous phase after separation therefrom of said organic phase; and (f$_3$) recovering a purified uranium compound from the last-mentioned aqueous phase.

4. The method defined in claim 3 wherein said organic phase prior to scrubbing contains at least 99.9% of the uranium of said third solution and the aqueous phase resulting from the stripping operation contains at least 99.9% of the uranium from said organic phase.

5. The method defined in claim 1 further comprising the step of eluting protactinium as the oxalate or sulfate from said adsorbent with oxalic or sulfuric acid.

References Cited

UNITED STATES PATENTS

| | | | |
|---|---|---|---|
| 2,855,269 | 10/1958 | Boyd et al. | 23—337 |
| 2,903,333 | 9/1959 | Lowe et al. | 23—337 |
| 2,943,923 | 7/1960 | Morgan | 23—341 |
| 3,049,400 | 8/1962 | Rainey et al. | 23—341 |
| 3,316,065 | 4/1967 | Baertschi et al. | 23—324 |
| 3,322,509 | 5/1967 | Vogg | 23—325 |
| 3,360,346 | 12/1967 | Huet et al. | 23—341 |
| 3,577,225 | 5/1971 | Schaffer et al. | 23—325 |

FOREIGN PATENTS

| | | | |
|---|---|---|---|
| 1,108,042 | 3/1968 | Great Britain | 23—325 |

CARL D. QUARFORTH, Primary Examiner

F. M. GITTES, Assistant Examiner

U.S. Cl. X.R.

252—301.1 R; 423—5, 6, 10, 11, 15, 252